3,260,709
COPOLYMERS OF CYANO-CONTAINING COMPOUNDS

Eric Nield, Stevenage, England, assignor to Imperial Chemical Industries Limited, London, England, a corporation of Great Britain
No Drawing. Filed Aug. 12, 1963, Ser. No. 301,618
Claims priority, application Great Britain, Aug. 16, 1962, 31,495/62
8 Claims. (Cl. 260—85.5)

The present invention relates to new copolymers and more particularly to new copolymers of derivatives of acrylonitrile.

According to the present invention I provide copolymers prepared by the polymerization of a derivative of acrylonitrile having the structure

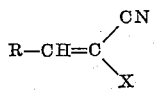

where R is an alkyl radical and X is CN or COOR' where R' is a monovalent hydrocarbon radical, together with a vinyl compound containing no nitrogen atoms and which is non-aromatic when X is CN. I prefer R to contain not more than 4 carbon atoms because the copolymers derived from higher homologues tend to suffer from having undesirably low softening points.

By a vinyl compound I mean a monoethylenically unsaturated compound containing the structure $CH_2=CH-$.

The compound having the structure

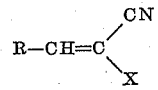

may be either an alkylidene malodinitrile having the structure $R-CH=C(CN)_2$ or an ester of an $\alpha$-cyano-$\beta$-alkyl substituted acrylic acid having the structure $$R-CH=C(CN)COOR'$$

I prefer to use those acrylonitrile derivatives in which R is a methyl group; that is, ethylidene malodinitrile, $CH_3-CH=C(CN)_2$ and esters of $\alpha$-cyanocrotonic acid such as ethyl-$\alpha$-cyanocrotonate, $$CH_3-CH=C(CN)COOC_2H_5$$

I further prefer the esters of $\alpha$-cyanocrotonic acid because in general the copolymers derived from them are of better color than those derived from ethylidene malodinitrile. There is also a tendency for the copolymers derived from these esters to have higher softening points than equivalent copolymers derived from ethylidene malodinitrile. Copolymers of the specified esters with vinyl aromatic compounds, particularly styrene, have very good softening points.

Examples of non-aromatic vinyl monomers suitable for copolymerizing with the derivatives of acrylonitrile are terminally unsaturated alkenes such as propylene, butene-1 and pentene-1; vinyl ethers such as vinyl methyl ether, vinyl ethyl ether, vinyl isopropyl ether, vinyl butyl ether, vinyl isoamyl ether and vinyl phenyl ether; vinyl esters such as vinyl formate, vinyl acetate and vinyl propionate, vinyl halides such as vinyl fluoride, vinyl chloride and vinyl bromide and acrylic acid and its esters such as methyl acrylate and ethyl acrylate. Examples of vinyl aromatic compounds which may be copolymerized with our specified esters include styrene, and its nuclear-substituted derivatives such as o-chlorostyrene and vinyl toluene.

Copolymers containing up to about 50 molar percent of the acrylonitrile derivative may be obtained and I have found that materials suitable for molding are obtained when the copolymers comprise approximately equimolar proportions of the two comonomers.

My copolymers may also contained small amounts of other copolymerizable monomers if desired. My preferred copolymers are those having a high molecular weight making them of use in molding and extrusion processes and copolymers having reduced viscosities of at least 0.40 are very suitable.

Reduced viscosity is defined by the formula $$RV = \frac{t_1 - t_0}{t_1 \cdot c}$$

where RV is the reduced viscosity, $t_0$ is the time of flow of solvent in a viscometer, $t_1$ is the time of flow of the solution of the polymer in the solvent and $c$ is the concentration of the solution in grams per 100 cc.

My copolymers may be formed by the polymerization together of the constituent monomers in the presence of a free radical catalyst in bulk, in solution in a solvent which will not react with the monomeric ingredients or in suspension in a liquid which is a non-solvent for the monomers, e.g. water. Suitable solvents for solution polymerization include benzene, toluene, xylene, hexane, heptane, dichloroethane and dioxane. Where high molecular weight products are required, it is preferred to use a solvent which has little or no chain-transfer activity, such as benzene.

Free-radical catalysts that may be used include peroxides such as benzoyl peroxide, lauroyl peroxide, caproyl peroxide, acetyl cyclohexyl sulphonyl peroxide and acetyl peroxide, per-esters such as t-butyl perbenzoate and azo compounds such as azo-bisisobutyronitrile. The catalyst is preferably used in amounts of from 0.05% to 5% by weight of polymerizable monomer although larger or smaller amounts may be used, if desired. However, the use of large amounts of catalyst will generally result in the production of polymers of low molecular weight.

The polymerization is generally effected at atmospheric or subatmospheric pressure although super-atmospheric pressures may be used, if desired.

Suitable temperatures for the polymerization are at or slightly above room temperature, for example from 20° C. to 60° C., but the use of higher or lower temperatures is not excluded. Temperature control may be used to some extent to control the molecular weight of the polymeric product, the use of lower temperatures in general giving rise to the products of higher molecular weight.

The copolymers have useful softening points and may be molded to give transparent products or may be extruded or otherwise fabricated, if desired. The molding may be effected at temperatures of about 150–200° C. They are soluble in a number of common solvents and may be used for film-forming by solvent-casting.

The copolymers are generally obtained in the form of powders which may be compacted to easily handled particles by pelleting or any other suitable method.

Moldings and films formed from the copolymers are hard, tough, generally transparent and resistant to attack by water and those derived from copolymers of esters of $\alpha$-cyanocrotonic acid are generally colorless or only slightly colored.

Before processing, the copolymers may be compounded with suitable additives such as heat and light stabilizers, fillers, pigments, lubricants, mould-release agents and plasticizers and may be blended with other natural or synthetic polymeric materials if desired.

The invention is illustrated by the following examples in which all parts are expressed as parts by weight.

Example 1

28 parts of ethyl α-cyanocrotonate, an equimolar amount (i.e. 20 parts) of vinyl isobutyl ether and 0.5 part of azo-bisisobutyronitrile were heated in vacuo at 50° C. for three days. The resulting copolymer was dissolved in benzene, reprecipitated from methanol and finally dried in vacuo at 50° C. to give 35 parts of a polymer having a reduced viscosity of 1.7. The reduced viscosity in this and other examples was measured on a solution of 0.5 gm. of the polymer in 100 ccs. of dimethyl formamide at 25° C.

Analysis of the polymer gave a nitrogen content of 6.1% by weight, equivalent to a 52.5% molar concentration of ethyl α-cyano-crotonate.

The copolymer was compression molded at 200° C. to give an almost colorless transparent disc having a 10/10 Vicat softening point of 133° C. (Its 1/10 Vicat softening point was 125.5° C.)

Example 2

0.2 mole (28 parts) of ethyl α-cyanocrotonate, 0.21 mole (8.8 parts) of propylene, and 0.3 part of azo-bisisobutyronitrile were dissolved in 43.9 parts of benzene which had just been carefully dried over sodium. The mixture was heated in vacuo at 50° C. for 20 days to give a viscous solution. The viscous solution was diluted with benzene and the copolymer was freed by precipitating it from methanol, filtering it and drying it in vacuo at 50° C. The yield was 18 parts of a copolymer having a reduced viscosity of 0.22 and having a nitrogen content equivalent to the presence of 49.5% molar of the α-cyanocrotonate in the copolymer.

Example 3

The process of Example 1 was repeated using 28 parts of ethyl α-cyanocrotonate, 17.2 parts (i.e. an equimolar amount) of vinyl acetate and 0.3 part of azo-bisisobutyronitrile and the mixture was maintained in vacuo at 50° C. for 5 days. The resulting copolymer was dissolved in benzene and purified as described in Example 1 to give 37 parts of a material having a reduced viscosity of 1.06.

Analysis of the copolymer gave a nitrogen content of 6.2%, equivalent to the presence of 49.8% molar of the α-cyanocrotonate.

The copolymer was compression molded at 200° C. to give an amber colored transparent disc with a 10/10 Vicat softening point of 122° C. and a 1/10 Vicate softening point of 110.5° C.

Example 4

The process of Example 3 was repeated, but using instead of the vinyl acetate, 14.4 parts (i.e. an equimolar amount) of vinyl ethyl ether. After working up, 27 parts of a copolymer were obtained having a reduced viscosity of 1.86 and a nitrogen content of 6.5% equivalent to the presence in the copolymer of 48.5% molar of the α-cyanocrotonate.

Almost colorless transparent discs were compression molded from the polymer at 200° C. and these had a 10/10 Vicat softening point of 131° C.

Example 5

28 parts of ethylidene malodinitrile, 13.2 parts of propylene and 1 part of acetyl cyclohexyl sulphonyl peroxide were dissolved in 43.9 parts of benzene and the mixture was heated in vacuo at 30° C. for 14 days. Ether was added at the end of that period and the precipitated polymer was filtered off and dried in vacuum to give 14 parts of a material with a reduced viscosity of 0.15.

Example 6

Following the process of Example 1, 28 parts of ethylidene malodinitrile, an equimolar amount (i.e. 30 parts) of vinyl isobutyl ether and 0.5 part of azo-bisisobutyronitrile were heated together at 70° C. for 7 days in vacuo. The resulting polymer was dissolved in benzene, precipitated from ether, filtered and dried. The yield was 43 parts of a copolymer having a reduced viscosity of 0.84 and a 10/10 Vicat softening point of only 93° C., compared with a 10/10 Vicat softening point of 133° C. for the equivalent copolymer derived from ethyl α-cyanocrotonate. It was compression molded at 150° C. to give deep orange colored transparent discs.

Example 7

The process of Example 6 was repeated using an equimolar amount (i.e. 21.6 parts) of vinyl ethyl ether in place of the vinyl isobutyl ether. The yield was about 100% theoretical of a polymer with a reduced viscosity of 1.01 and a 10/10 Vicat softening point of 81° C. It will be noted that the softening point of an equivalent copolymer derived from equimolar amounts of vinyl ethyl ether and ethyl α-cyanocrotonate (as shown in Example 4) had a 10/10 Vicat softening point 50° C. higher, at 131° C. The moldings were deep orange in color but transparent.

Example 8

The process of Example 2 was repeated using as the catalyst 0.3 part of acetyl cyclohexyl sulphonyl peroxide instead of azobisisobutyronitrile and gave 7 parts of a polymer with a reduced viscosity of 0.14.

Example 9

A reaction mixture comprising 28 parts of ethyl α-cyanocrotonate, 12.5 parts of vinyl chloride, 43.9 parts of benzene and 0.3 part of azo-bisisobutyronitrile was degassed and heated in vacuo at 60° C. for 4 days. At the end of this period, the polymer was precipitated by adding 40–60° petrol to the mixture. The precipitated polymer was filtered off and dried in vacuo to yield 14 parts of a copolymer having a reduced viscosity of 0.15.

Example 10

A reaction mixture comprising 28 parts of ethyl α-cyanocrotonate, 20 parts of vinyl isobutyl ether, 78 parts of cyclohexane and 0.5 part of azo-bisisobutyronitrile was degassed and heated in vacuo at 60° C. for 6 days. The mixture was then poured into 40–60° petrol and the polymer precipitated out. The precipitate was filtered and dried to give 20 parts of a copolymer having a reduced viscosity of 0.64. It was compression molded at 200° C. to give almost colorless transparent discs.

Example 11

28 parts of ethyl α-cyanocrotonate and 20 parts of vinyl isobutyl ether were dispersed in 200 parts of water containing 0.5 part of sodium lauryl sulphate and a catalyst system comprising 0.5 part of potassium persulphate and 0.5 part of sodium metabisulphite.

The dispersion was stirred at room temperature under an atmosphere of nitrogen for four days. The latex so formed was coagulated by the addition of a brine solution and the copolymer was filtered from the aqueous medium, washed well with water and methanol and dried in vacuum. The yield was 28 parts of a copolymer having a reduced viscosity of 6.54. In spite of its high molecular weight, the copolymer could be compression molded at 200° C. without difficulty to give almost colorless transparent discs.

Example 12

The process of Example 11 was repeated using 15 parts of vinyl chloride in place of vinyl isobutyl ether. The yield was 13 parts of a copolymer with a reduced viscosity of 0.56.

Example 13

The process of Example 11 was repeated using 8.4 parts of propylene in place of vinyl isobutyl ether to yield 9.5 parts of a copolymer having a reduced viscosity of 0.33.

Example 14

A mixture of 28 parts of ethyl α-cyanocrotonate, 20.8 parts of styrene, 43.9 parts of benzene and 0.3 part of azobisisobutyronitrile was degassed and heated in vacuo at 60° C. for 27 hours. The polymeric product was precipitated into methanol, filtered and dried in vacuum. The yield was 30 parts of a copolymer having a reduced viscosity of 0.49. The copolymer was compression moulded to give almost colorless transparent discs having the remarkably high 10/10 Vicat softening point of 167.5° C. The 1/10 Vicat softening point was 162° C.

Nitrogen analysis showed the copolymer to contain 36 mole percent of the cyanocrotonate.

I claim:

1. A copolymer of ethyl α-cyanocrotonate and a vinyl compound containing the structure $CH_2=CH-$ selected from the group consisting of alkenes having from 3 to 5 carbon atoms, vinyl alkyl ethers in which the alkyl groups contain from 1 to 5 carbon atoms, styrene, derivatives of styrene in which an aromatically-bound hydrogen atom has been replaced by a radical selected from halogen atoms and a methyl group, vinyl halides, compounds having the structure $CH_2=CH.COOR$ and compounds having the structure $CH_2=CH.OCOR$ where R is selected from the group consisting of hydrogen, methyl and ethyl, the amount of ethyl α-cyanocrotonate being up to about 50 molar percent, said polymer being the product obtained by copolymerizing a monomer mixture of ethyl α-cyanocrotonate and said vinyl compound in the presence of a free radical catalyst.

2. The copolymer of claim 1 having a reduced viscosity of at least 0.40, measured on a solution of 0.5 gm. of the polymer in 100 ccs. of dimethyl formamide at 25° C.

3. A process for the manufacture of a moldable thermoplastic copolymer of ethyl α-cyanocrotonate and a vinyl compound, said polymer containing up to about 50 molar percent ethyl α-cyanocrotonate which comprises reacting ethyl α-cyanocrotonate with a vinyl compound containing the structure $CH_2=CH-$ selected from the group consisting of alkenes having from 3 to 5 carbon atoms, vinyl alkyl ethers in which the alkyl groups contain from 1 to 5 carbon atoms, styrene, derivatives of styrene in which an aromatically-bound hydrogen atom has been replaced by a radical selected from halogen atoms and a methyl group, vinyl halides, compounds having the structure $CH_2=CH.COOR$ and compounds having the structure $CH_2=CH.OCOR$ where R is selected from the group consisting of hydrogen, methyl and ethyl, in the presence of from 0.05 to 5% by weight of the copolymerizable monomer of a free radical polymerization catalyst and at a temperature of from 20 to 60° C.

4. A copolymer of ethyl α-cyanocrotonate and vinyl isobutyl ether, the amount of ethyl α-cyanocrotonate being up to about 50 molar percent, said polymer being the product obtained by copolymerizing a monomer mixture of ethyl α-cyanocrotonate and vinyl isobutyl ether in the presence of a free radical catalyst.

5. A copolymer of ethyl α-cyanocrotonate and vinyl ethyl ether, the amount of ethyl α-cyanocrotonate being up to about 50 molar percent, said polymer being the product obtained by copolymerizing a monomer mixture of ethyl α-cyanocrotonate and vinyl ethyl ether in the presence of a free radical catalyst.

6. A copolymer of ethyl α-cyanocrotonate and propylene, the amount of ethyl α-cyanocrotonate being up to about 50 molar percent, said polymer being the product obtained by copolymerizing a monomer mixture of ethyl α-cyanocrotonate and propylene in the presence of a free radical catalyst.

7. A copolymer of ethyl α-cyanocrotonate and vinyl acetate, the amount of ethyl α-cyanocrotonate being up to about 50 molar percent, said polymer being the product obtained by copolymerizing a monomer mixture of ethyl α-cyanocrotonate and vinyl acetate in the presence of a free radical catalyst.

8. A copolymer of ethyl α-cyanocrotonate and vinyl chloride, the amount of ethyl α-cyanocrotonate being up to about 50 molar percent, said polymer being the product obtained by copolymerizing a monomer mixture of ethyl α-cyanocrotonate and vinyl chloride in the presence of a free radical catalyst.

References Cited by the Examiner

UNITED STATES PATENTS

| | | | |
|---|---|---|---|
| 2,466,395 | 4/1949 | Dickey | 260—85.5 |
| 2,776,232 | 1/1957 | Shearer et al. | 260—85.5 |

OTHER REFERENCES

Brown et al.: Chem. Abs., 49 (1955), p. 8919C.

D'Alelio: Fundamental Principle of Polymerization, John Wiley & Sons, Inc. (New York), 1952, p. 49.

JOSEPH L. SCHOFER, Primary Examiner.

DONALD E. CZAJA, Examiner.

HARRY WONG, Assistant Examiner.